US008868449B2

(12) United States Patent
Saarinen et al.

(10) Patent No.: US 8,868,449 B2
(45) Date of Patent: Oct. 21, 2014

(54) ACTIVE TICKET WITH DYNAMIC CHARACTERISTIC SUCH AS APPEARANCE WITH VARIOUS VALIDATION OPTIONS

(75) Inventors: Petteri Saarinen, Helsinki (FI); Mia Lahteenmaki, Helsinki (FI); Zheng Yan, Espoo (FI)

(73) Assignee: Nokia Corporation, Espoo (FI)

( * ) Notice: Subject to any disclaimer, the term of this patent is extended or adjusted under 35 U.S.C. 154(b) by 1539 days.

(21) Appl. No.: 11/890,824

(22) Filed: Aug. 7, 2007

(65) Prior Publication Data
US 2008/0071637 A1 Mar. 20, 2008

Related U.S. Application Data

(62) Division of application No. 10/675,857, filed on Sep. 30, 2003.

(51) Int. Cl.
G06Q 30/00 (2012.01)
H04L 29/06 (2006.01)
G07B 15/00 (2011.01)

(52) U.S. Cl.
CPC ................................ H04L 63/10 (2013.01); G07B 15/00 (2013.01)
USPC ........................... 705/26.1; 705/27.1; 705/1.1

(58) Field of Classification Search
USPC ..................................................... 705/26, 27
See application file for complete search history.

(56) References Cited

U.S. PATENT DOCUMENTS

| 5,621,797 | A | 4/1997 | Rosen ............................. 380/24 |
| 6,601,046 | B1 | 7/2003 | Epstein |
| 7,044,362 | B2 | 5/2006 | Yu |
| 7,177,843 | B2 | 2/2007 | Nguyen et al. |
| 7,392,226 | B1 * | 6/2008 | Sasaki et al. ..................... 705/64 |
| 7,728,838 | B2 * | 6/2010 | Forney et al. .................... 345/474 |
| 8,037,193 | B2 * | 10/2011 | Hay et al. ......................... 709/229 |
| 2002/0004762 | A1 | 1/2002 | Izumoto |
| 2002/0065783 | A1 | 5/2002 | Na et al. |
| 2002/0111909 | A1 | 8/2002 | Lee |

FOREIGN PATENT DOCUMENTS

| CN | 1423473 | 6/2003 |
| EP | 1 367 542 | 12/2003 |
| EP | 1 275 070 | 1/2007 |
| EP | 1 444 242 | 2/2007 |
| KR | 1020020093200 | 12/2002 |
| WO | WO 00/62260 | 10/2000 |

(Continued)

OTHER PUBLICATIONS

EPO Search Report issued Feb. 23, 2009 (3 pages).
Tweed, Duncan, "Mobile Ticketing-Barriers to Entry," Consult Hyperion, draft, Aug. 13, 2001 (2 pages).

(Continued)

*Primary Examiner* — Rob Pond
(74) *Attorney, Agent, or Firm* — Ditthavong & Steiner, P.C.

(57) ABSTRACT

A method and apparatus is provided for providing an active ticket in a mobile terminal for use by a mobile terminal user, wherein at least one active ticket has a ticket characteristic that dynamically changes based on one or more states in a life cycle of the active ticket. Dynamic changes to the ticket characteristic include multimedia changes or other presentation data, including text, sound (audio), animation, video, still pictures, or some combination thereof. The active ticket can have different states in it's life cycle, such as purchased, validated, invalid for certain events. Also the ticket service provider or issuer can send new control data to change the characteristic and/or contents of the active ticket.

17 Claims, 14 Drawing Sheets

Buy Movie Ticket     Valid Movie Ticket     Invalid Movie Ticket

(56) References Cited

FOREIGN PATENT DOCUMENTS

| WO | WO 02/29738 | 4/2002 |
| WO | WO 03/071489 | 8/2003 |
| WO | WO 03/098503 | 11/2003 |

OTHER PUBLICATIONS

English language Abstract of KR 1020020093200 (2 pages).
English language Abstract of CN 1423473 (1 page).
Office Action for related U.S. Appl. No. 10/675,857 dated Sep. 20, 2012, pp. 1-21.

* cited by examiner

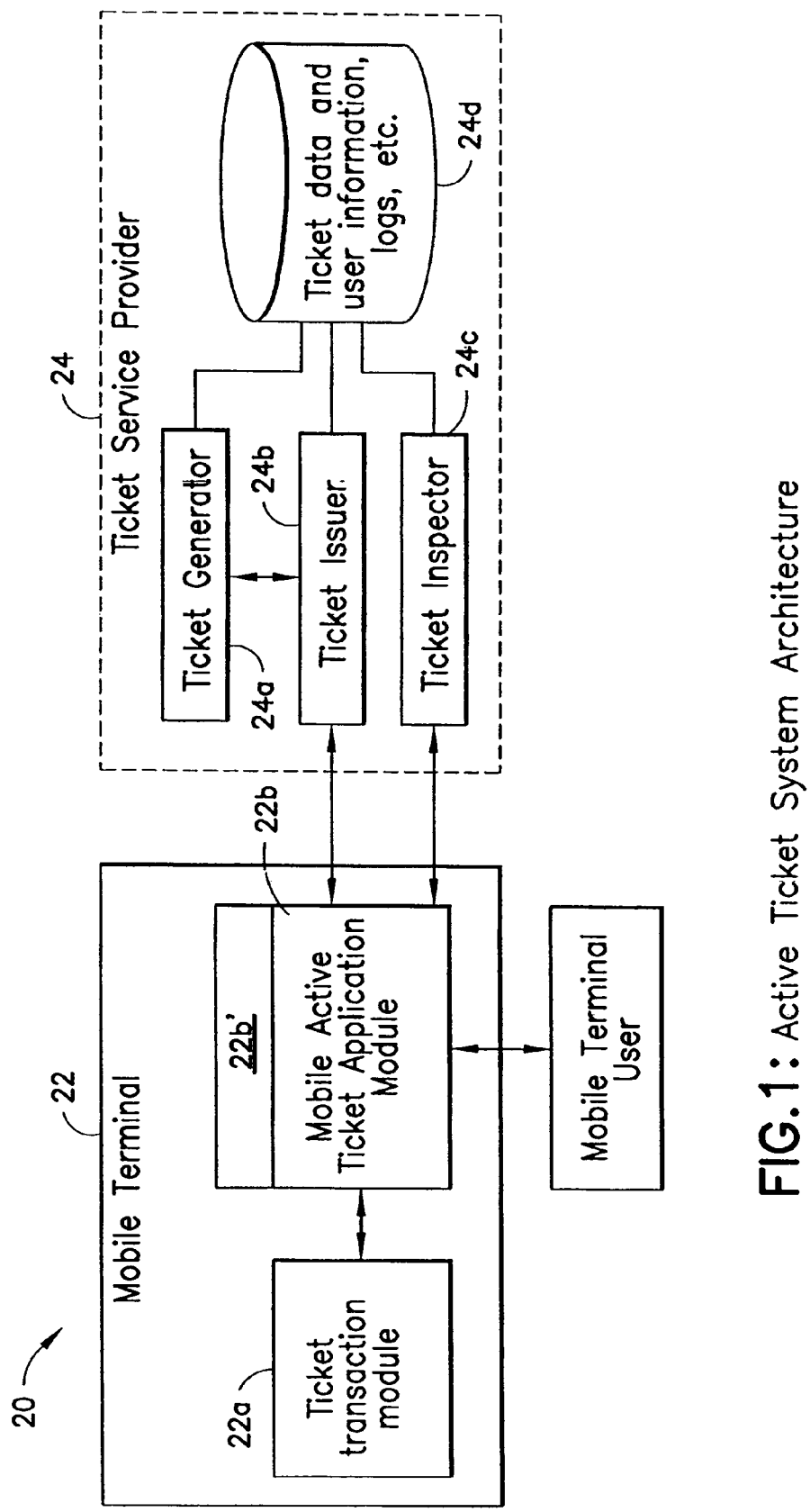
FIG.1: Active Ticket System Architecture

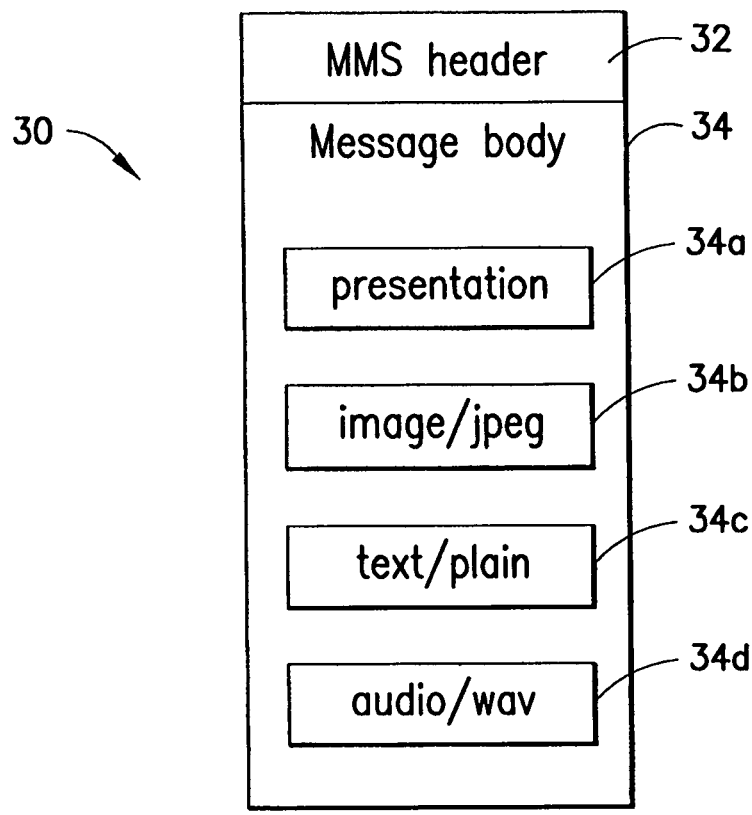
FIG.2: MeT Multimedia Ticket Data Format

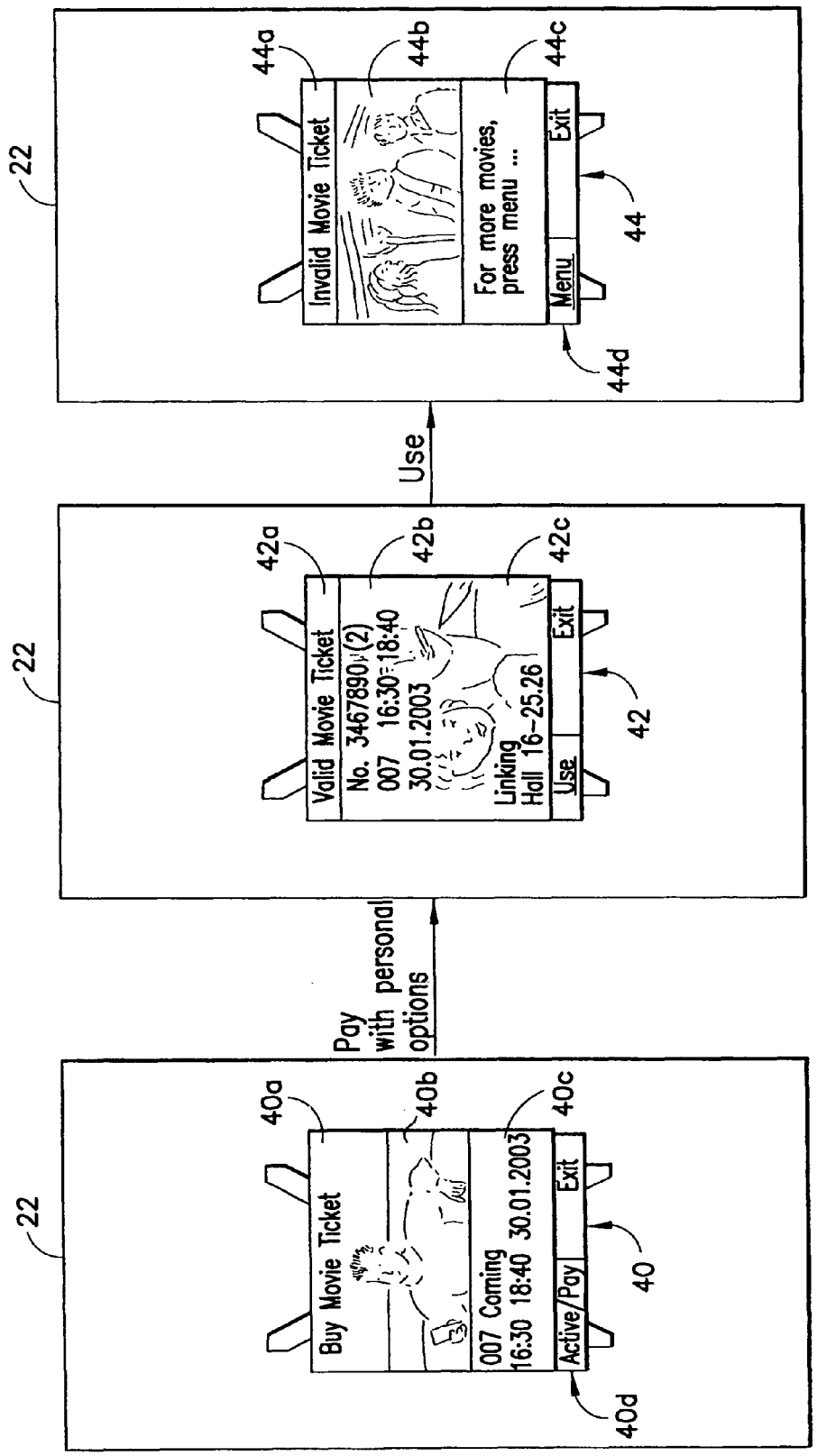

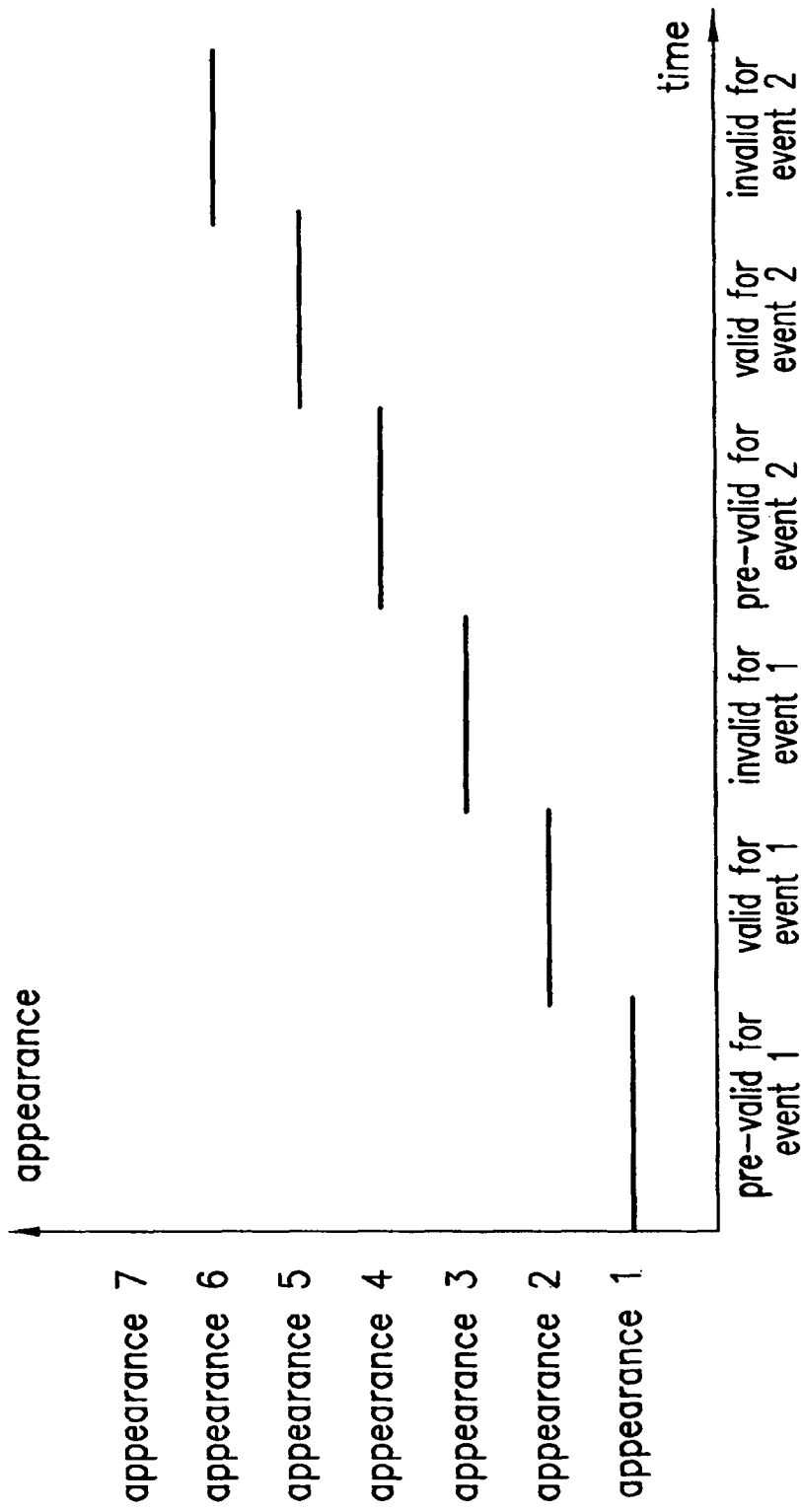
FIG. 4: Illustration of Dynamic Appearance of an Active Ticket

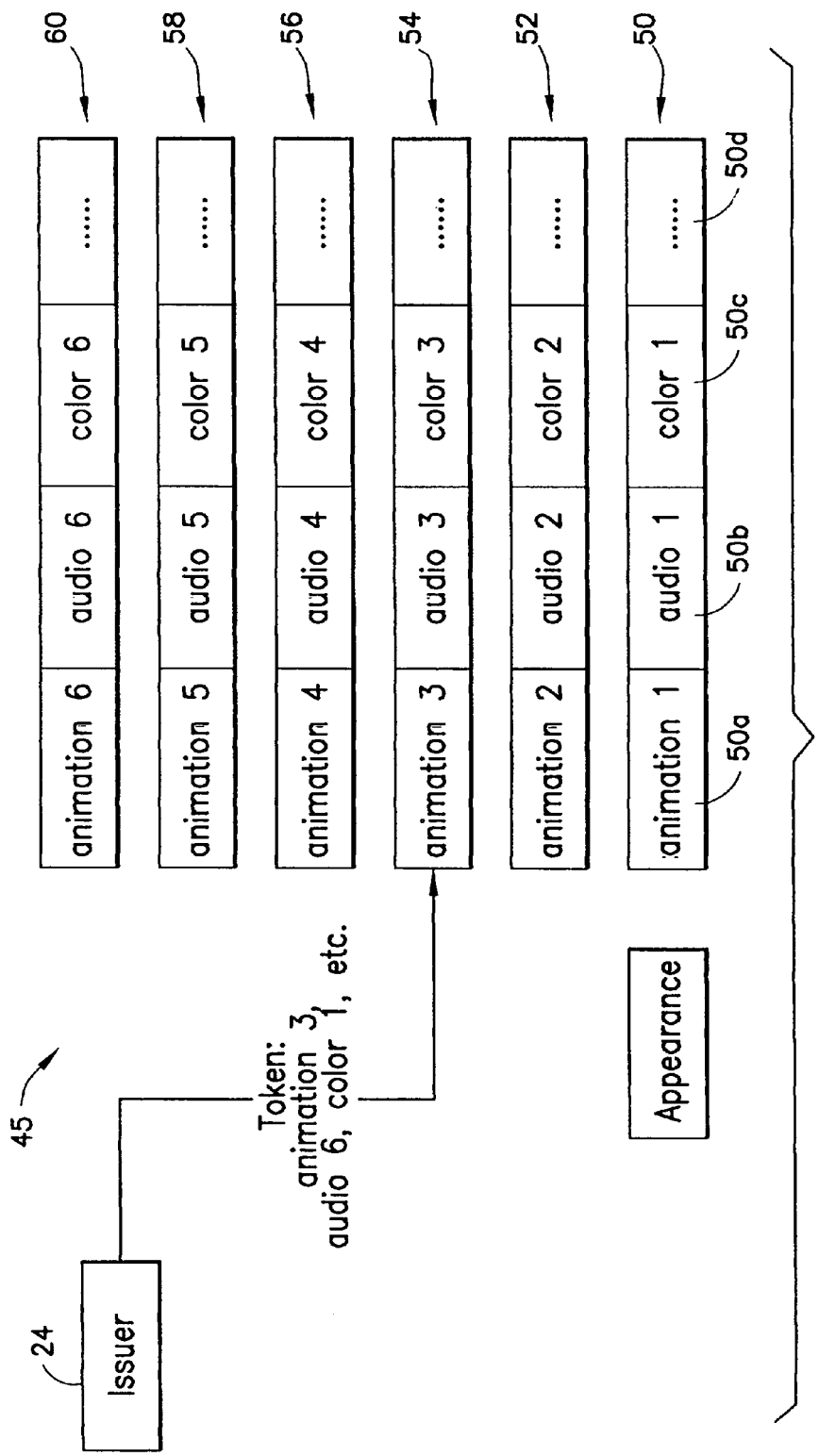
FIG.5: Illustration of Ticket Appearance in an Active Ticket Stack

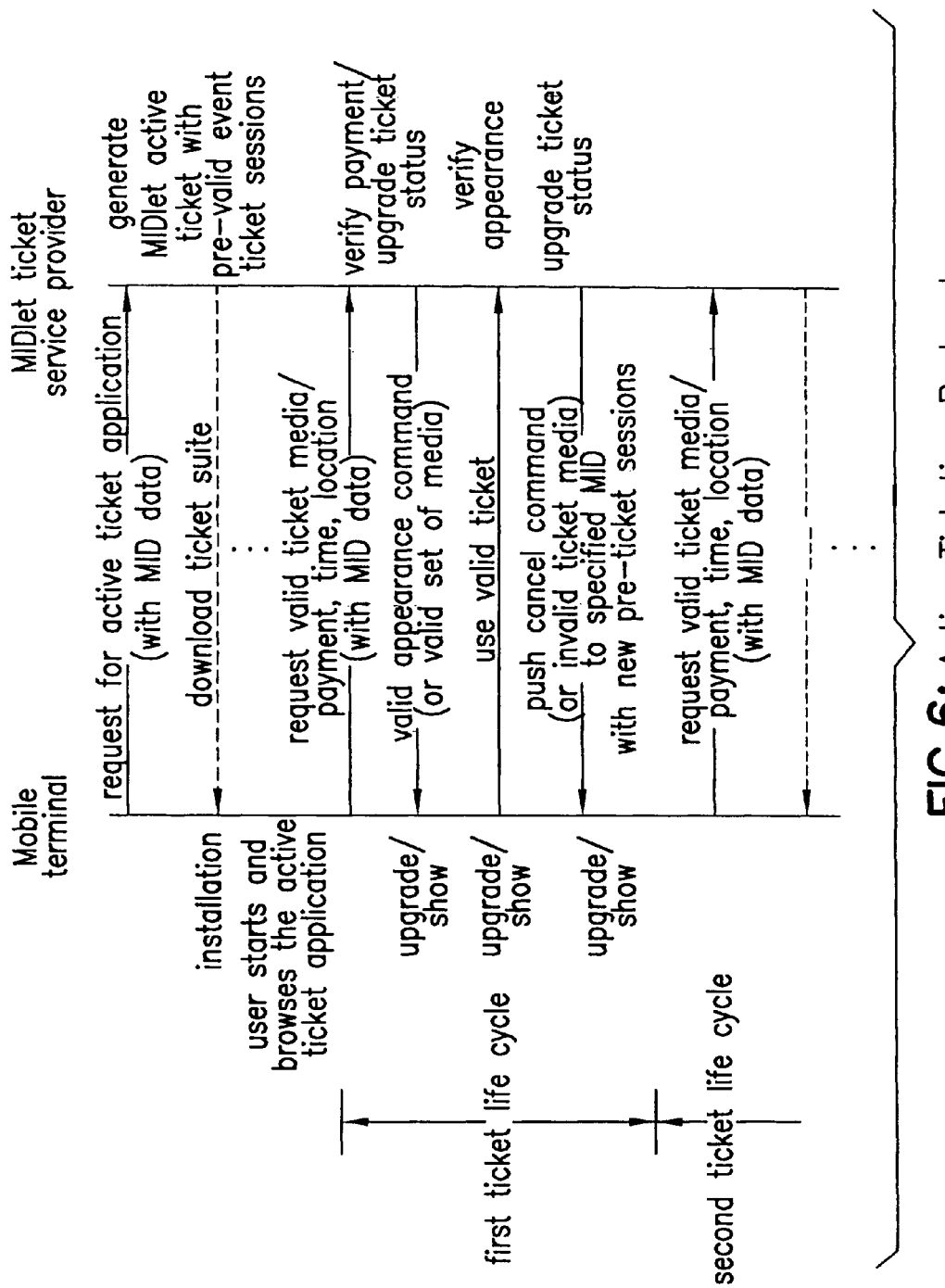
FIG.6: Active Ticketing Protocol

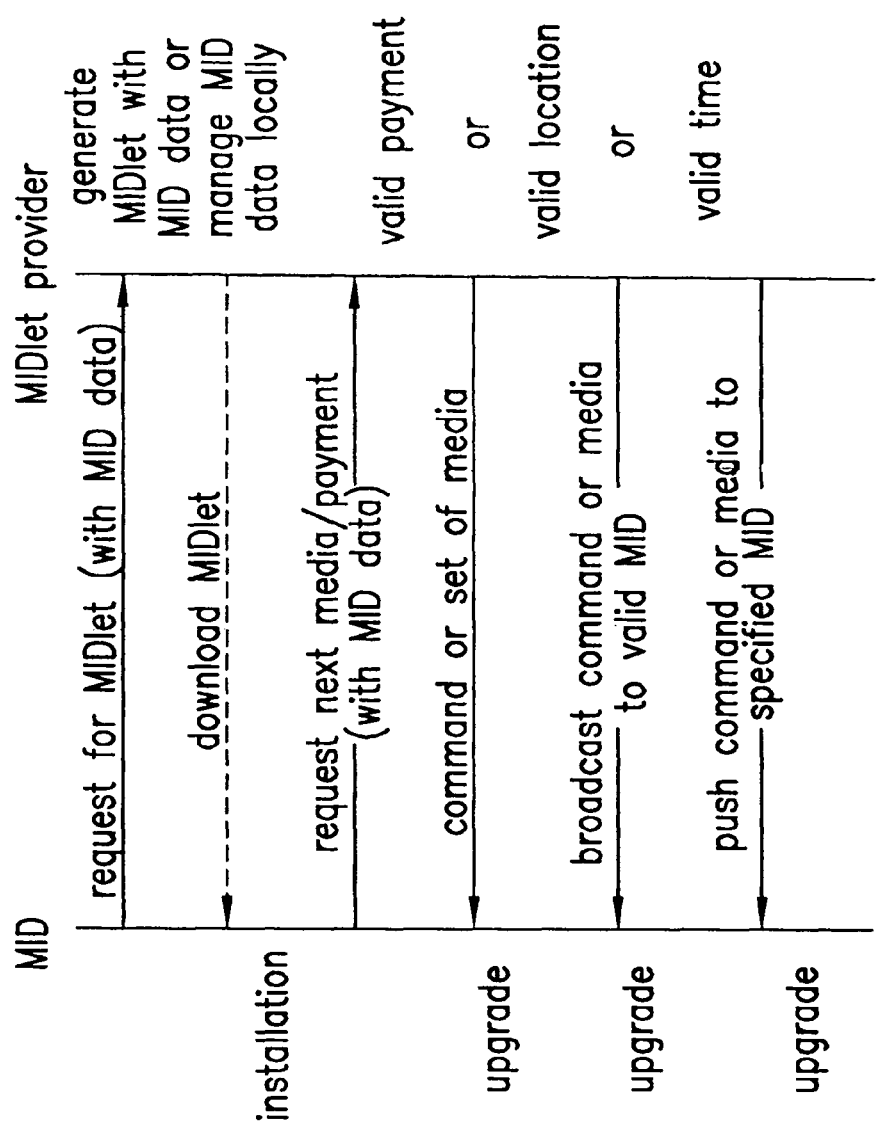
FIG. 7: Valid Active Ticket Driven Methods (w/Three Alternative Upgrading Methods)

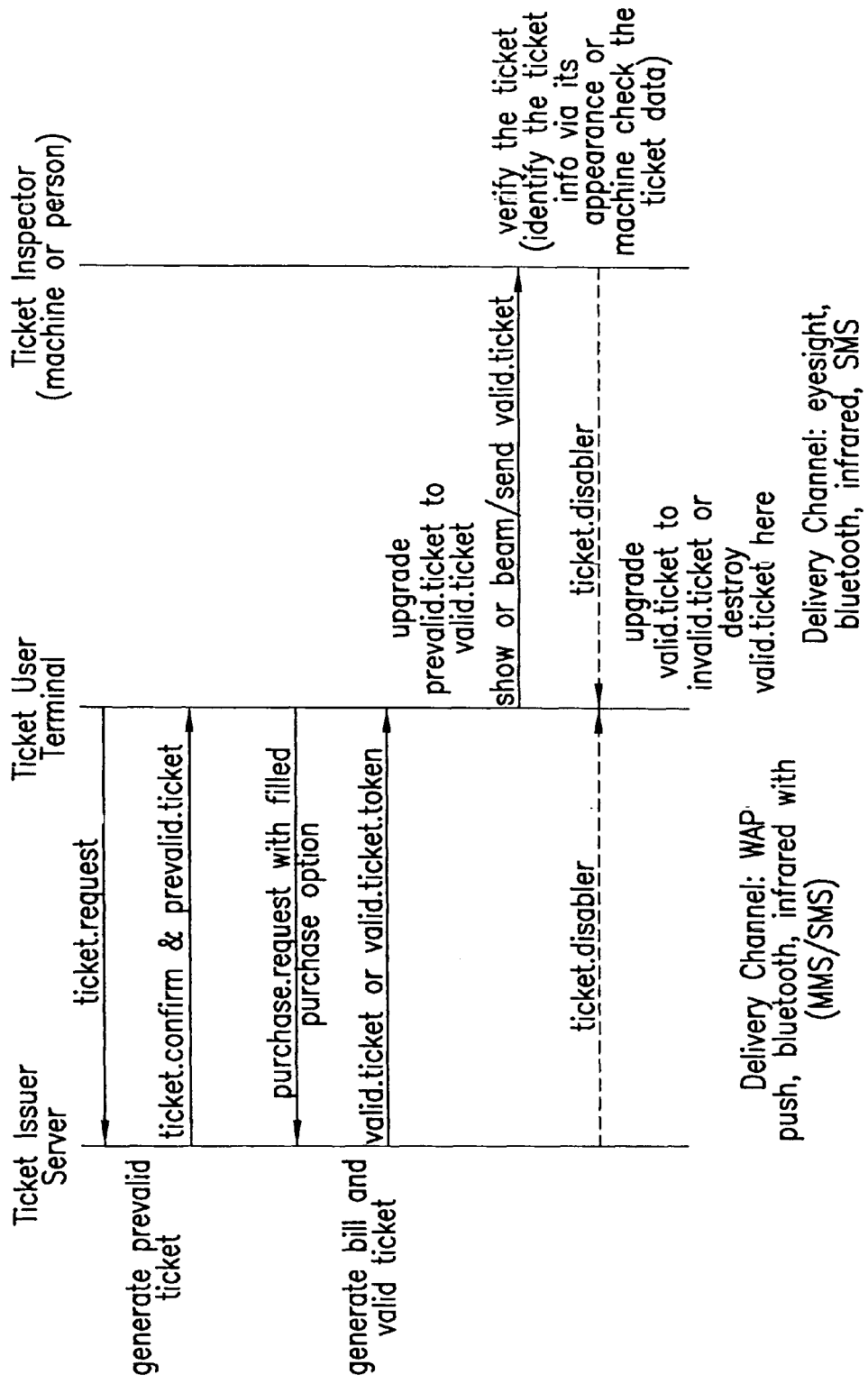
FIG.8a: Prevalid Active Ticketing Protocol

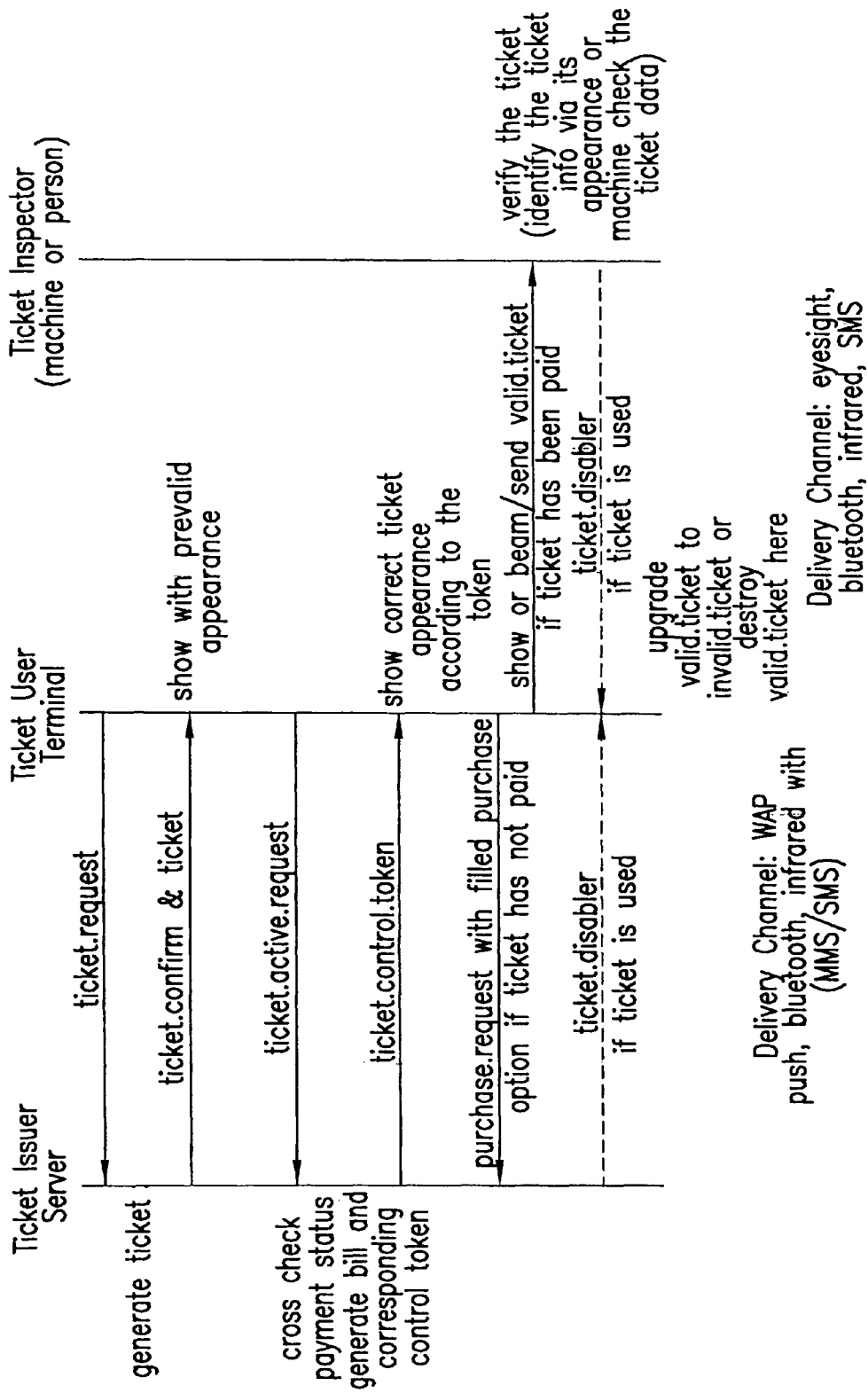
FIG. 8b: Active Ticketing Protocol with Cross Check

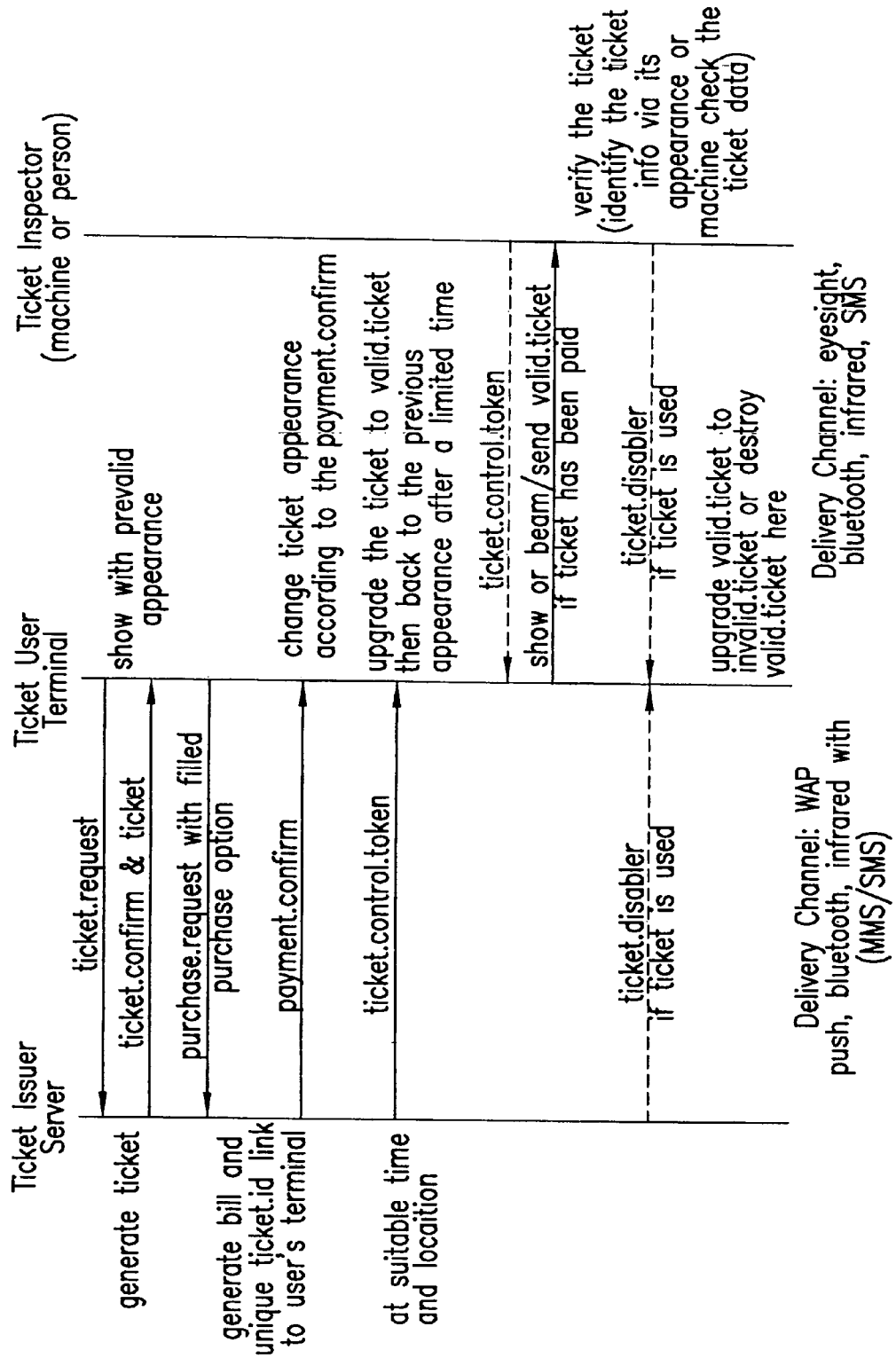

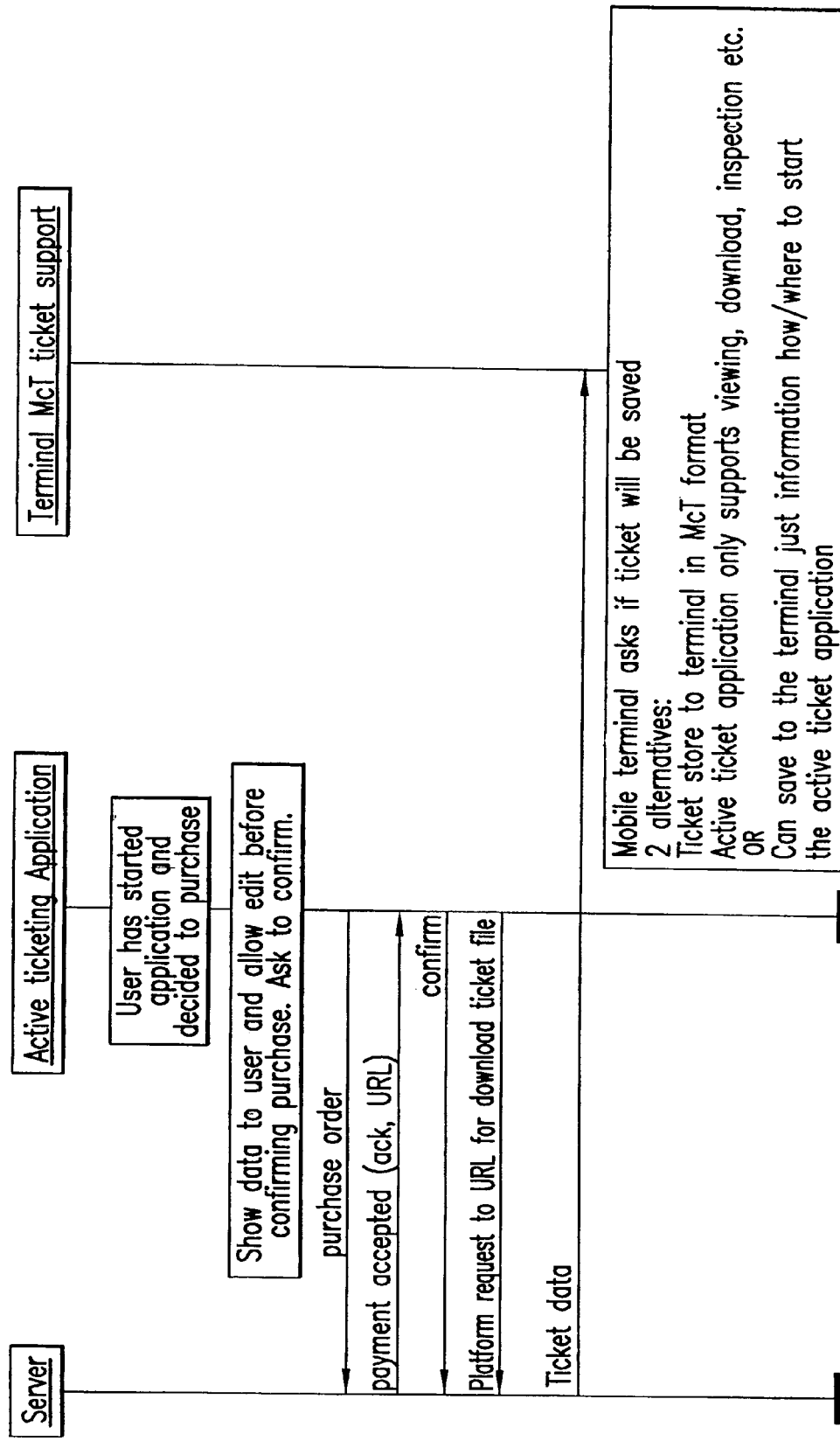
FIG.9a: Use Case Ticket Purchase Protocol

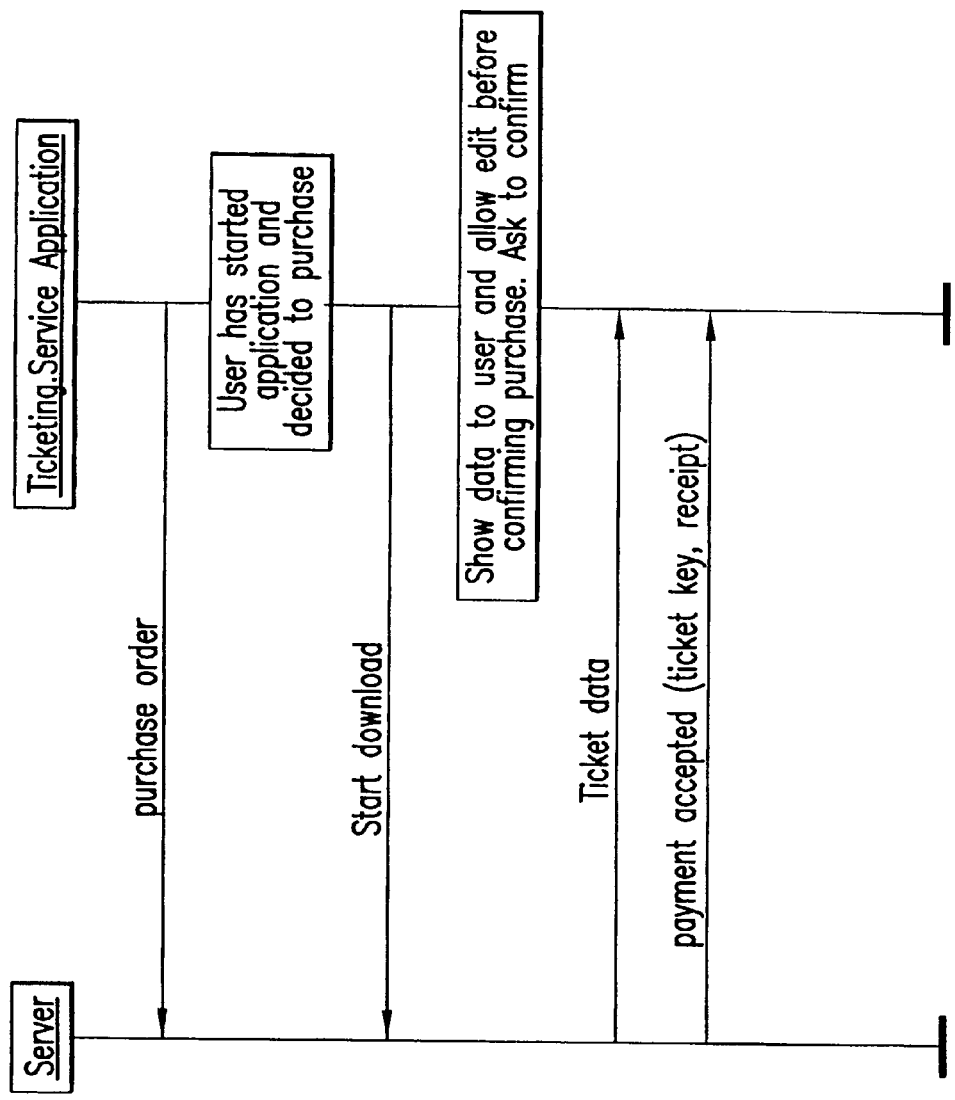
FIG.9b: Alternative Use Case Ticket Purchase Protocol

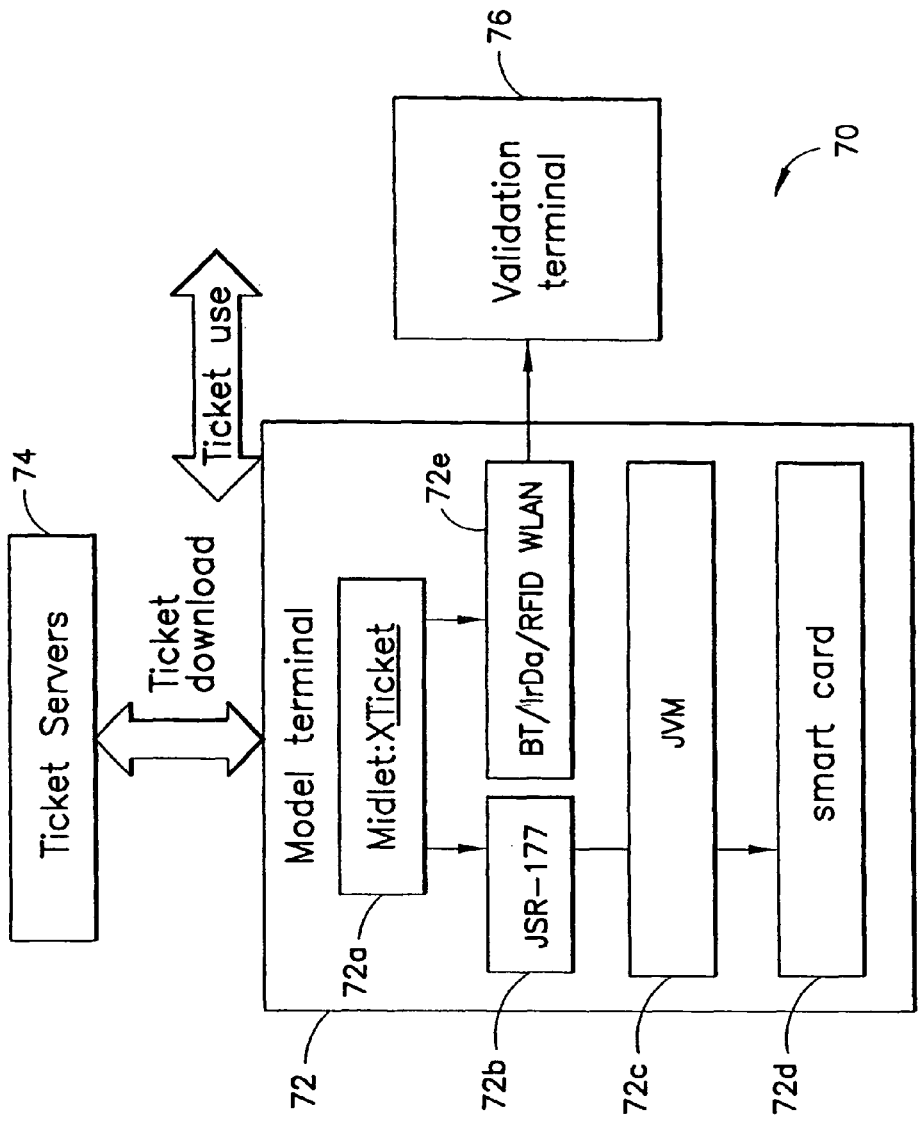
FIG.10a: Validation of Ticket Purchase

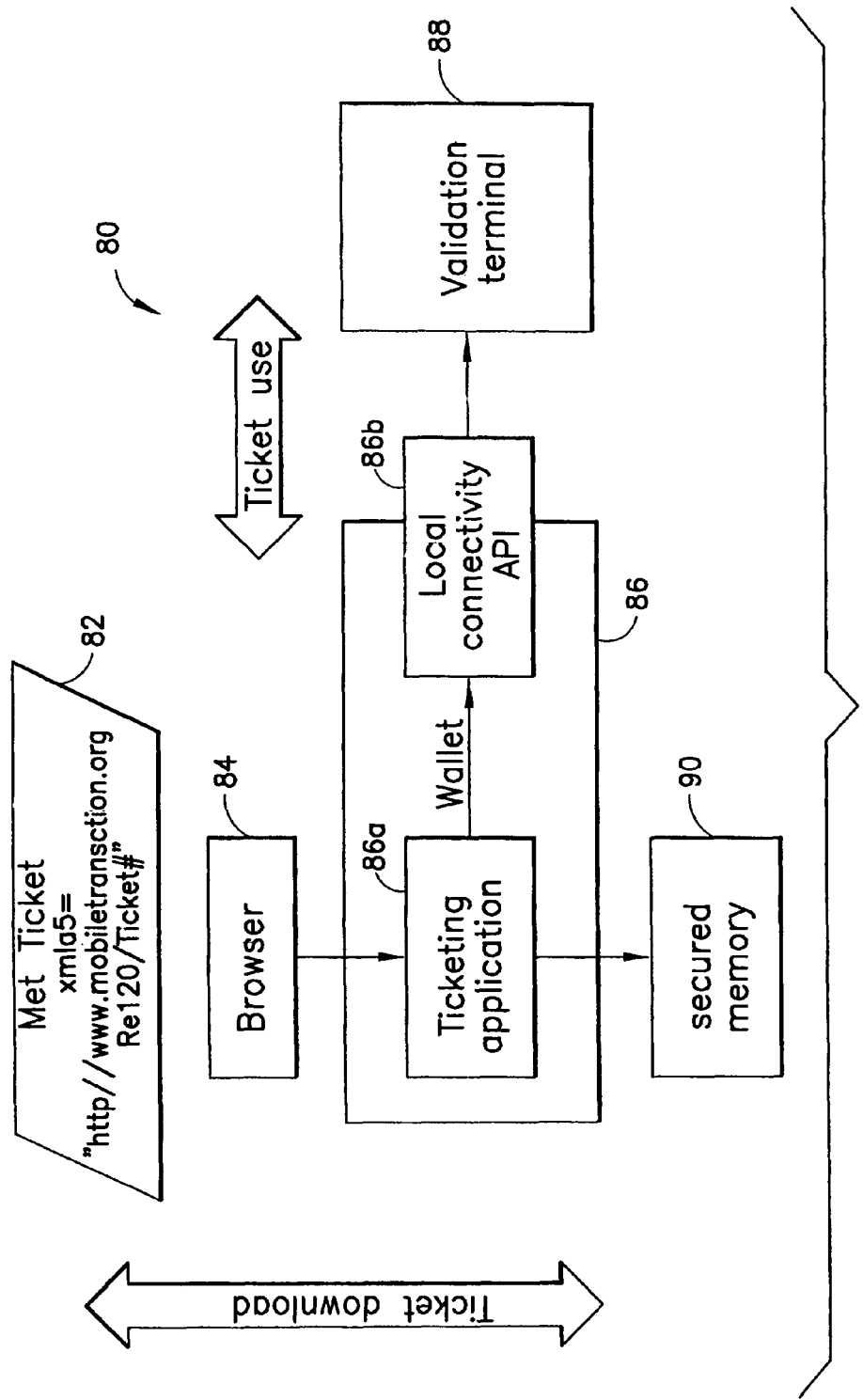
FIG.10b: Alternative of Validation of Ticket Purchase

ACTIVE TICKET WITH DYNAMIC CHARACTERISTIC SUCH AS APPEARANCE WITH VARIOUS VALIDATION OPTIONS

This application is a divisional application which claims priority from U.S. non-provisional patent application Ser. No. 10/675,857, filed on 30 Sep. 2003, now abandoned which is hereby incorporated by reference in its entirety.

BACKGROUND OF THE INVENTION

1. Field of Invention

This invention relates to a ticketing system; and more particularly, to a digital ticketing system for use in conjunction with a mobile phone or terminal.

2. Description of Related Art

There are many different known ways to provide a ticket to allow someone to gain access to an event or location. One known way is to distribute a physical ticket having the time and place of the event printed thereon. The ticket is typically handed to a gate attendant when someone enters the premise at which the event is being held. However, the known physical tickets have several problems associated with them, including: 1) They cannot be delivered digitally. In other words, it is impossible to deliver tickets remotely. 2) It is hard to check whether the known ticket is a stolen ticket in most cases, e.g. movie ticket. 3) It is hard to do digital management for the tickets. 4) The physical ticket wastes a lot of paper.

More recently, digital tickets have been developed and are now being used, including the use of the same in mobile phones or terminals. A digital ticket is a certificate that guarantees certain rights for the ticket owner. There are many applications for digital tickets, which include, e.g., an electronic stamp, an electronic coupon or a voucher. But most digital tickets are merely digital textual tickets in which rights of the ticket owner are described by text.

At the same time the digital ticket is becoming popular, some issues are also introduced. Digital tickets are quite suitable for delivering over networks, which makes it easy to be altered, pirated or superdistributed without any change and control. The digital copy of the ticket can be the same as the original that makes the ticket verification at redemption more difficult. Many solutions have been proposed for protecting digital tickets, but the extra protection often makes the digital ticket system too complicated, and therefore causes usability issues which impedes the digital ticket uses.

For example, in a mobile environment the digital ticket has some known problems. Mainly these are related to security issues. It is very easy to send some digital information from terminal to terminal and hence without proper security measures superdistribution of tickets is possible. Various techniques have been developed to overcome this problem. Many ticket validation systems are quite complicated and diminish the usability of such digital ticket systems.

Overall, mobile ticketing is a problem because of the copy protection issue. There are two basic known approaches in use today:

1. Mobile ticketing is now used in proprietary formats and used only with ticketing schemes with low value and low risk (e.g., SMS text based ticketing) or bar codes. This solution has a copy protection problem in that there is no protection: only the first one who is presenting the ticket gets the goods/access. This requires a cross check at the validation. Another option is that some kind of identification of the user is required in addition (e.g., phone number, drivers license). The problem is that the ticket validation should be a very fast process and this slows the process down.

2. Another alternative is to use security mechanisms for ticket validation and storage. Traditional cryptographic approaches, such as encryption/decryption, digital signature, etc., are used for protecting digital textual ticket, but it is heavy and costly for mobile devices/services as they should use the same scheme and has usability problem at the ticket redemption point because the following reasons:

a) Verification is needed when receiving the ticket.

b) Cross verification is needed during the redemption between the ticket owner device and the redemption point device.

Both of them cause extra communication and process cost. Key management is known to be a difficult task. System establishment is also very expensive. A trade-off has to be made between high security and easy usability.

In addition, the known digital tickets have several other problems, including: 1) It is easy to make an illegal copy of the known digital ticket that is impossible to validate without the help of a machine. 2) Copy protection for digital tickets is typically hard to implement, because, for example, cryptography and key handling for cryptography is complex and potentially risky or costly because it needs hardware secure elements on the terminal, etc. 3) Usability of the known digital tickets is a problem due to the complicated protection based on cryptography. 4) The known digital ticket is hard to conduct redemption/validity check, i.e. it is impossible to check/inspect by a human without machines. 5) The digital ticket makes it hard to support additional business for extra revenue. 6) The life cycle of the known digital ticket is short, and the content of the ticket is hard to renew or update after issuing (the current solution is issuing a new ticket; however, the user typically needs to delete the old ticket.)

The present invention provides a solution to the aforementioned problems in the art.

SUMMARY OF INVENTION

In its broadest sense, the present invention provides a new and unique method and apparatus for providing an active ticket in a mobile terminal for use by a mobile terminal user, wherein at least one active ticket has a ticket characteristic that dynamically changes based on one or more states in a life cycle of the active ticket. Dynamic changes to the ticket characteristic include either multimedia changes or other presentation data, including text, sound, animation, video, still pictures; or a movement of the mobile terminal, an emission of light therefrom, a change of shape; or some combination thereof.

The active ticket can have different states in it's life cycle, such as purchased, template, pre-valid, validated, invalid for certain events. Also the ticket service provider or issuer can send new control data to change the characteristic and/or contents of the active ticket. This information is sent only to the mobile terminal of the original purchaser of the active ticket, so unauthorized (i.e. pirated) superdistributed tickets, if any, will not receive this updated information. Moreover, it is also possible to change the characteristic or appearance of the ticket according to this information.

The ticket is active such that it contains an algorithm or program to change its multimedia or other presentation data according to different situations. The active ticket can contain text, sound, animation, video, or still pictures together or alone, including the algorithm for presenting it.

The active ticket is dynamic during its lifetime and better yet, new control data can be sent to it to change the algorithm, give the algorithm new parameter values or change other presentation data. This control data is a part of the active ticket but is received for example at a certain time and/or location, or just before the ticket is about to be used. This control data is sent only to legally purchased tickets and any copy made illegally is left without it, as it is not registered at the ticket service provider or issuer who sends the control data. After receiving the control data the active ticket is easily distinguishable from the illegal ones. Security here is enough for tickets with low and medium value.

The present invention allows ticket validation without machines. For example, with the copy protection mechanism of the active ticket, validation by the human eye is easy: the control data part can change the appearance of the ticket to, for example, a certain music or picture with a certain background. Ticket verification can be conducted based on image change, sound change and/or frequency change (duration change) of the animation. Without the control data the ticket can sound and look different indicating that the ticket is invalid. The validation can again change the ticket status.

According to the present invention, ticket validation can be based on unique sounds provided by the active ticket. This kind of machinery is typically inexpensive and can be processed at a server. Another option is to use certain sounds that can be verified by a human.

Ticket validation can also be based on unique light emitted by the active ticket. When the active ticket is started with the validation function, it may emit light in a sequence recognizable by the validation terminal, based on relative time duration of the luminous intensity sequences, so that the validation terminal can tell if the ticket is valid or not. Another option is to use relative intensity of the luminance for the signalling.

In effect, the invention is an active multimedia ticket that can replace the current existing tickets and provide more business opportunities and flexibility. The multimedia feature of the active ticket shows the ticket information and other information by video, audio, animation or some combination thereof. The active ticket is dynamic, which contains an algorithm to change its appearance when some event happens (e.g. when expiration time comes, when ticket has been used, etc.). In addition, new control data can also be sent to the active ticket to further control future ticket appearance.

This technique can be used for ticket renewing and sending advertisement information to the ticket user remotely, as well as for organizing a ticket-related campaign or a ticket game.

The active multimedia ticket of the present invention also provides various options for ticket validation based on sound, light, animation frequency and so on.

Some advantages of the active ticket according to the present invention are as follows:

With the active ticket, it is easy to introduce entertainment into the ticket business, therefore attracting more mobile digital ticket applications. It is flexible to support various business models, therefore, provide more new revenue making opportunities for ticket issuers.

The active ticket is more secure, harder to make a copy of, and easier to detect than any existing ticket. Because the active ticket is software based, it can be sent to the ticket user's handset and automatically installed. In effect, there is no use in copying the current appearance of the ticket, because the future appearance will be different from the current one. In view of this, it is hard to forge a valid ticket.

With the above advantages, the active ticket holds advanced usability over the prior art tickets because cross verification during the redemption between the ticket owner device and the redemption point device is not essential. Just by viewing and/or listening to the active ticket, the redemption inspector can verify if the ticket is valid.

The active ticket according to the present invention is also easy to implement since there is no need to handle cryptographic keys at the terminal side and it can be implemented by Java technology.

The active ticket according to the present invention is more flexible and can support various business models flexibly, because it is suited for: ticket inspection/verification by human eyes; ticket verification digitally by a device; one ticket container can support multiple tickets, so each ticket life can be endless; introducing entertainment into the ticket business so the user can participate in more ticket related activities, such as competition, gaming, etc.

The active ticket according to the present invention is more economical because the active ticket life-circle can be endless, shared by different events, the ticket carrier can take multiple tickets and wasted ticket paper will disappear.

The active ticket according to the present invention is more meaningful because video and audio mean much more than text, and the active multimedia ticket can contain more or enhanced information than other kinds of ticket.

Digital tickets are now being used in mobile terminals. Mobile terminals allow purchasing, downloading and viewing the digital tickets at anytime and anywhere. In view of this, the present invention brings true value not only to users, but also to ticket issuers. For the users, they may view the ticket on their mobile terminals and contact the ticket issuer or service provider easily. For the ticket issuers, they would be allowed to provide information to the users directly and inform them about changes or other details also after purchase.

The active ticket can be delivered over the Internet or mobile networks. One special way for active ticket delivery can be Wireless Access Protocol (WAP) push Java mobile information device profile (MIDP) carried ticket to mobile handsets. The ticket is carried by a Java application, such as MIDlet, therefore can be installed and played at Java-enabled mobile handsets, but cannot be super-forwarded after installation. However, it is important to note that the scope of the invention is not intended to be limited to only JAVA based programming environments; instead, the scope of the invention is intended to include implementations other than using JAVA based programming environments.

The less secure simple ticketing technique according to the present invention would fit for tickets where the issuer does not want to have a pre-established relationship and security application on the mobile terminal. The implementation does not require a very ticket specific implementation on the mobile terminal and is therefore easily implemented, since no device hardware or platform, per se, is necessary.

From a business point of view, system establishment is a key point. In order to introduce a new service that can replace an existing system, it is very important to provide the potential for new revenue opportunities. The introduction of the new system is more likely possible when established based on the existing infrastructure. Therefore, it is easy to be deployed by service providers. The uses envisioned for the present invention include, but are intended to be limited to:

Entrance (movie, opera, sport game, museum) ticket,
Complex multimedia ticket with event campaign involved,
Travel ticket (bus ticket, periodic ticket, time ticket, air ticket),
Club (swimming, tennis, etc. member ticket) ticket,
Group ticket (school ticket), and
Campaign ticket (e.g. coupon ticket—with special offer described by text, image and audio, etc.).

One active ticket application can work as a ticket folder to support all of above tickets in parallel or in series. Alternatively, the tickets can be in different active ticket applications (e.g., application suites in Java implementations).

In addition to the aforementioned method, the present invention also provides a new and unique mobile terminal for providing an active ticket for use by a mobile terminal user, wherein the mobile terminal includes a mobile active ticket application module that provides at least one active ticket having a ticket characteristic that dynamically changes based on one or more states in a life cycle of the active ticket that has capability to access other terminal components (e.g. mWallet) by being verified as trusted by the terminal, as well as a new ticket service provider for communicating with a mobile terminal, wherein the ticket service provider includes a ticket issuer module that provides to a mobile terminal either at least one active ticket or control information for activating or deactivating at least one active ticket for use by a mobile terminal user, the at least one active ticket having a ticket characteristic that dynamically changes based on one or more states in a life cycle of the active ticket. The invention also provides a new wireless network consistent with the aforementioned.

Java Implementation

Considering Java enabled mobile terminals, additions needed for active ticketing would be small: Support for a new ticket type—or another way to communicate to the terminal that this is a ticket. This will provide that the ticket is automatically installed in the ticket folder. Such support may be added to the Mobile Wallet.

The active ticket could be an MIDP, Personal Java, or C-application downloaded to the device. Optionally, there could be a ticket folder in the terminal that can handle the ticket. It can forward partial information carried by the ticket, such as an advertisement, purchase settings, etc. (This information should be allowed to be forwarded by the ticket service provider or issuer.)

Control data can be pushed to the applications, or it can be fetched when the application is communicating with the server side using existing communication technology.

The ticket issuer can control the dynamic characteristic or appearance change remotely by providing a control token to the mobile terminal. The token sending may be uniquely based on the International Mobile Equipment Identification (IMEI) code, or other terminal or subscriber identification, even an IP address. So the sending of the information can only reach the registered ticket user's personal trusted device. Timing may be based on the issuer's clock, so it would be hard to attack the timer. This model is suitable for cases when the ticket value is high, human eyes conduct the ticket redemption check or validation checking digitally, or online digital ticket verification. This way is also convenient for the issuer to broadcast (multicast) extra multimedia to the ticket holders, therefore it is easy to set up ticketing related entertainment and campaign.

Ticket validation by the human can be based on the presentation of the data that is only available when the control data has been received. This makes copying much more difficult beforehand but still the validation without machine is easy.

Validation based on audio can be implemented for example with relative frequency change. In addition, an audio watermark (time-stamp, location, event) can also be embedded into the ticket using a secret key. Machine-based verifier can use the same secret key to detect and verify the authority of the ticket by listening to the sound of the ticket.

BRIEF DESCRIPTION OF THE DRAWING

The drawing, not drawn to scale, includes the following Figures:

FIG. 1 shows a block diagram of an active ticket system architecture according to the present invention.

FIG. 2 shows a block diagram of a known mobile transaction (MeT) multimedia ticket data format that may be used to implement the present invention.

FIG. 3 shows three different ticket samples according to the subject matter of the present invention, which are shown by way of example. The scope of the invention is not intended to be limited to any particular text or graphic display provided on the active ticket.

FIG. 4 is an illustration of a dynamic appearance of an active ticket.

FIG. 5 is an illustration of a ticket appearance in an active ticket stack.

FIG. 6 shows a diagram of an active ticketing protocol.

FIG. 7 is a diagram of valid active ticket driven methods (w/three alternative upgrading methods).

FIG. 8a is a diagram of prevalid active ticketing protocol.

FIG. 8b is a diagram of an active ticketing protocol with a cross check.

FIG. 8c is a diagram of a location-based active ticketing protocol.

FIG. 9a is a diagram of a use case ticket purchase protocol.

FIG. 9b is a diagram of an alternative use case ticket purchase protocol.

FIG. 10a is a block diagram of a validation of a ticket purchase.

FIG. 10b is a block diagram of an alternative of validation of a ticket purchase.

DETAILED DESCRIPTION OF INVENTION

FIG. 1: Active Ticket System Architecture

FIG. 1 shows an active ticket system architecture generally indicated as 20 having a mobile terminal 22 and a ticket service provider 24.

The mobile terminal 22 includes a ticket transaction module 22a and a mobile active ticket application module 22b. The ticket transaction module 22a provides the functionality for supporting the purchasing of an active ticket, which can be implemented as an m-wallet in the mobile phone or micropayment function based on short messaging service (SMS), operator billing, payment card purchase, or any current or future payment systems depending on the business model. The mobile active ticket application module 22b contains a mobile active ticket application 22b' that is the ticket installed and run at the mobile terminal 22. The mobile active ticket application 22b' provides at least one active ticket having a ticket characteristic that dynamically changes based on one or more states in a life-cycle of the active ticket. The mobile active ticket application module 22b and mobile active ticket application 22b' are responsible for contacting with the ticket provider 24 (issuer and inspector) and connecting with the ticket transaction module 22a for ticket transaction (e.g. payment). By way of example, the mobile active ticket application module 22b is shown and described as including the mobile active ticket application 22b', although the scope of the invention is intended to include implementations in which the mobile active ticket application 22b' is formed as a separate unit, or in which the mobile active ticket application module 22b and the mobile active ticket application 22b' are formed as part of the same unit. The mobile terminal may also includes a centralized ticket manager (not shown) for viewing and/or managing the tickets that a user has, thus saving the user the effort of staring each active ticket application when wanting to view a list of tickets in different active ticket applications. The centralized ticket manager may also form part of the mobile active ticket application module 22b.

The ticket service provider 24 includes a ticket generator module 24a, a ticket issuer 24b, a ticket inspector 24c and a ticket data and user information logs 24d. The ticket generator module 24a is responsible for generating tickets for the mobile terminal users. The ticket issuer 24b provides to the mobile terminal 22 either at least one active ticket or control information for activating or deactivating the at least one active ticket for use by a mobile terminal user, and is responsible for both delivery and updating of the active ticket. The ticket inspector 24c is the function or person to check the validity of the active ticket.

The mobile terminal 22, the ticket service provider 24 and aforementioned modules and elements thereof, including the ticket transaction module 22a, mobile active ticket module 22b, ticket generator module 24a and ticket issuer 24b, may be implemented using hardware, software, or a combination thereof. The scope of the invention is not intended to be limited to any particular implementation thereof. For example, a typical software implementation may include using a microprocessor architecture having a microprocessor, a random access memory (RAM), a read only memory (ROM), an input/out devices and a control, address and data-bus for connecting the same.

FIG. 2: MeT Multimedia Ticket Data Format

FIG. 2 shows the MeT Multimedia ticket format generally indicated as 30, which in one embodiment is adapted to support the active ticketing format that is the subject matter of this patent application. The MeT Multimedia ticket format 30 includes an MMS header 32 and a message body 34, which has presentation 34a, image/jpeg 34b, text/plain 34c and audio/wav 34d fields.

For example, for a valid ticket appearance the active ticket follows the MeT Multimedia ticket format as shown. Therefore, it is possible for an MeT compatible ticket player and inspector to recognize the ticket.

For a pre-valid ticket appearance and used ticket appearance, there is no such ticket format support, so it is easy to identify a real ticket.

Alternatively, in another embodiment, for the pre-valid ticket, the MeT Multimedia ticket format is adapted to only carry the template of the ticket format. While for the valid ticket, the valid ticket information is filled in the MeT Multimedia ticket format. For the used ticket, the valid ticket information is removed by the active ticket application module 22b' accordingly.

FIG. 3: Ticket Samples

FIG. 3 shows three different ticket samples according to the subject matter of the present invention, which are shown by way of example. The scope of the invention is not intended to be limited to any partivular text or graphic display provided on the active ticket.

FIG. 3A: Buy Movie Ticket

FIG. 3A shows an example of a buy movie ticket generally indicated as 40, which is displayed on the mobile terminal 22 that enables the user to buy a movie ticket from the ticket service provider 24. The buy movie ticket functionally includes a first text section 40a indicating the action "Buy Movie Ticket", an image section 40b showing a scene from a movie, a second text section 40c indicating a whole or partial title of the movie, i.e. "007 Coming", as well as a time, i.e. "16:30-18:40", and a date, i.e. "30.1.2003", when the movie is showing, and a third section generally indicated as 40d having icons "Active/pay" or "Exit" for the user to click on to pay for the movie ticket or exit the display.

FIG. 3B: Valid Movie Ticket

FIG. 3B shows an example of a valid movie ticket generally indicated as 42, which is displayed on the mobile terminal 22 after the user pays for the movie ticket. The valid movie ticket includes a first text section 42a indicating the text "Valid Movie Ticket", an image section 40b showing a scene from a movie, a movie ticket confirmation no., i.e. "3467890", the number of tickets, i.e. "(2)", a whole or partial title of the movie, i.e. "007", as well as a time, i.e. "16:30-18:40", and a date, i.e. "30.1.2003", when the movie is showing, and a second section generally indicated as 40c having the icons "Use" or "Exit" for the user to click on to use the movie ticket or exit the display.

FIG. 3C: Invalid Movie Ticket

FIG. 3C shows an example of an invalid movie ticket generally indicated as 44, which is displayed on the mobile terminal 22 that shows the user that the movie ticket purchased from the ticket service provider 24 after it is used. The invalid movie ticket includes a first text section 44a indicating the text "Invalid Movie Ticket", an image section 44b showing a scene from a movie, a second text section 44c indicating the text "For more movie, press menu", and a third section generally indicated as 44d having icons "Active/pay" or "Exit" for the user to click on to display the menu of movies to purchase tickets for or to exit the display.

The scope of the invention is not intended to be limited to any particular state in the life cycle of the ticket, and is intended to include other states such as template, pre-valid and prepared depending on the ticket issuer.

FIG. 4: Illustration of Dynamic Appearance of an Active Ticket

FIG. 4 shows a graph of time versus ticket appearance for a given mobile terminal, and indicates that the ticket appearance or characteristic of an active ticket according to the present invention changes according to both time and the status of the active ticket.

For example, during a pre-valid period of event 1, the ticket appearance is indicated as appearance 1. When the ticket user wants to redeem the ticket or it is time or at the location to redeem the ticket, the issuer sends ticket data to the user's personal trusted handset, which activates the ticket to appearance 2, as shown. After using the ticket, a redemption point or ticket issuer drags the active ticket to appearance 3. Then the ticket comes to the next ticket event, and so forth.

The active ticket is dynamically shown. The ticket activation is controlled by control data issued by the ticket service provider or issuer 24 (FIG. 1). The control data indicates which kind of appearance should be shown. After getting the data, the mobile active ticket application module 22b will function to display the ticket on the mobile terminal 22 based on the instruction of the control data.

Alternatively, the scope of the invention is also intended to include special cases or implementations where high security is desired, and there is hardware available, the control data may be sent from a secure element inside, or attached, or communicating with the mobile terminal. In some of these cases, no connection to the ticket provider would need to be established for fetching the control data but the secure element or smart card could replace/deliver it. The secure element may also hold an algorithm to infer if the ticket status should be set to valid and it could take any external information as its input (location, etc.) or nothing at all.

FIG. 5: Illustration of Ticket Appearance in an Active Ticket Stack

FIG. 5 shows six ticket appearances in an active ticket stack generally indicated as 45 of the mobile terminal 22, that includes six (6) tickets 50, 52, 54, 56, 58, 60, each having an animation section 50a, an audio section 50b, a color section 50c, as well as one or more other sections generally indicated as 50d.

By way of example, a simple design is shown. With one animation and one audio, the control data indicates how frequent the animation is, how fast the audio is, what the background color of the animation image is, how light it is, etc. As shown, the issuer 24 provides the control data in the form of a token containing, e.g., the information "animation 3, audio 6, color 1, etc." that determines the characteristic of ticket appearance 54. The scope of the invention is not intended to be limited, for example, to the number of active tickets stored in the stack 45, or the type or kind of information stored in the stack 45.

FIG. 6: Active Ticketing Protocol

FIG. 6 shows, by way of example, an active ticketing protocol generally indicated as 100, according to the present invention.

In summary, the active ticketing protocol 100 indicates that there can be several active ticket in the mobile terminal 22 (depending on the wanted business model). Inside every active ticket there can be several event tickets (a ticket to a football match, movie, etc.) and each event ticket can have a series of life cycles.

In the active ticketing protocol 100, the mobile terminal provides a request for an active ticket application to the ticket service provider. By way of example, the request is shown to have mobile information device (MID) data and the ticket service provider is an application ticket service provider. In response, the ticket service provider generates an application active ticket with pre-valid event ticket sessions and downloads one or more ticket suites to the mobile terminal. After installation, the user of the mobile terminal starts and browses the active ticket application. To start a ticket life cycle, the user of the mobile terminal requests a valid ticket media with payment, time and location (with MID data) to the ticket service provider. In response, the ticket service provider verifies payment, upgrades the ticket status and provides a valid appearance command (or valid set of media) to the mobile terminal. At an appropriate time or place, the mobile terminal provides a use valid ticket request to the ticket service provider. In response, the ticket service provider verifies the appearance of the active ticket, upgrades the ticket status, and provides a push cancel command (or invalid ticket media to the specified MID) to specified MID with new pre-ticket sessions, which ends the ticket life cycle. Each ticket life cycle has a similar active ticketing protocol.

FIG. 7: Valid Active Ticket Driven Methods (w/Three Alternative Upgrading Methods)

FIG. 7 shows a protocol for valid active ticket driven methods with the last three upgrading methods being alternatives, including:

Payment driven,

Valid time driven (push new ticket appearance (i.e. upgraded ticket package) to the ticket at a certain time, or send an appearance change command to the ticket application.), and Valid location driven (push new ticket appearance (i.e. upgraded ticket package) to the ticket at a preferred location, or send an appearance change command to the ticket application at preferred location.)

Command Driven Methods

In operation, the mobile active terminal ticket application 22b' verifies the command validity and changes the ticket appearance accordingly.

There are several ways to send command or media to the end user's terminal, including via a broadcast method or push by request method.

Broadcast

In one embodiment, broadcast encryption technology can be used to broadcast a ticket appearance driven command.

The theory of the broadcast encryption is as follows: The scheme addresses the case when an authority broadcasts some valuable contents and it is required that only legitimate clients should be able to decrypt the content. It also proposes efficient ways to trace down the traitor who has constructed the new decryption.

The following steps can be applied for broadcasting the command to a number of user terminals:

1. The ticket issuer generates a root key, which can derive a number of seed keys.

2. Distribute the seed keys to the users before issuing the ticket.

3. Broadcast the command encryption by the root key and indicate which seed keys can be used for decryption based on the data managed by the ticket provider.

4. Only the user who is holding the valid seed keys (which are allowed to decrypt the command package) can decrypt the command package and upgrade the ticket appearance to the valid one.

The broadcast method can be used for time or location based ticket appearance driven Push by request.

In an alternative embodiment, the mobile active ticket application 22b' requests via payment or other measures to upgrade the appearance change of the active ticket.

The characteristics of several tickets can be managed by the active ticket application. It controls the ticket status (e.g. pre-valid, valid, invalid, remove) through commands from the ticket provider. One implementation method is as follows:

1) The active ticket application contains the ticket provider's public key certificate, 2) Any command is signed by the provider and verified by the active ticket application, 3) According to the content inside the valid command, the active ticket changes the ticket status of the indicated ticket, 4) The latest ticket status could be managed at the secure element of the terminal and protected by it. (For Java implemented active ticket application, it could access the status through the JSR 177 APIs).

Payment Consideration

It is preferred that payment works as a valid ticket appearance driven. It helps to realize equal-value data exchange. Mobile payment can be embedded into the ticket application. One possible implementation is a message-based micro-payment that can be implemented inside the ticket application (the one possible implementation of active ticket is a Java application). The ticket application can send SMS to the ticket provider which contains payment data in order to request next the valid ticket appearance. Other payment schemes may be implemented using voice call or HTTP protocols.

As the one example explained above shows: An active ticket can contain a payment initiator/payment method. This is probably new in ticketing. Also, payments and purchases can be made through existing or appearing systems.

DRM Protection

In the present invention, ticket valid appearance is driven to the valid device and checked by the device. Illegal copy of the active ticket application cannot get a valid appearance driven package (command and/or new media). In this way, the invention can defend a digital rights compromise.

Other Advantages of the Invention

Other advantages of the invention include:
Mobile terminal storage saving, and
Mobile terminal power saving.

Due to the storage and processing limitation of the mobile terminal, it is impossible to package heavy media with the application. The invention provides a safe way to support multimedia ticketing with rounds of life cycle, and at the same time, saves the terminal's memory.

FIG. 8a: One Ticketing Protocol

FIG. 8a illustrates a ticketing protocol in which a pre-valid ticket is initially provided to the ticket user terminal. In this protocol, the ticket user terminal provides a ticket request to a ticket issuer server. In response, the ticket issuer server generates a prevalid ticket and sends a message to the ticket user terminal containing a ticket confirmation and the pre-valid ticket. The ticket user terminal may then provide to the ticket issuer server a purchase request with purchase options. In response, the ticket issuer server generates a bill and a valid ticket and sends to the ticket user terminal a message containing the valid ticket or valid ticket token. Upon receiving the message, the ticket user terminal may upgrade the prevalid ticket to a valid ticket. In order to use the active ticket, the user of the ticket user terminal either shows or beams the valid ticket to a ticket inspector, who verifies the active ticket by identifying the ticket information via its characteristic (e.g. appearance) or a machine may check the ticket data. After the ticket is used, either the ticket issuer server or the ticket inspector may disable the active ticket by either upgrading the valid ticket to an invalid ticket or destroying the valid ticket.

The basic idea is to form an active ticket having several states with different appearances carried by different applications. As shown, the Digital Rights Management (DRM) usage control is different at different states. For example, a pre-valid ticket application may be provided with forward and copy free, embedded with payment initiator. A valid ticket application may be provided with forward and copy disable will be sent to the user's terminal after payment to replace the pre-valid ticket if necessary. An invalid ticket application may be provided with forward and copy free, will be sent to the user's terminal after ticket redemption and replace the valid ticket.

If security requirement is not high, a new ticket application can be replaced by a control token push (with new rights) to instruct a new ticket show.

The technique support may include using an OTA provision for upgrading a ticket with a new status. and DRM protection needed for the valid ticket application (forward and copy are not allowed).

The advantages include compatibility with OMA DRM, and different status with different copy rights benefits ticket delivery (ad hoc delivery at the pre-valid ticket stage), as well as greatly supporting mobile payment by making it as the easiest way of ticket purchasing.

Some disadvantages include that the provision of the application causes more rounds of communication, which can be improved by sending a control token message together with new rights. In addition, this approach cannot be supported by older mobile terminals.

FIG. 8b: Active Ticketing Protocol with Cross Check

FIG. 8b illustrates a ticketing protocol in which a pre-valid ticket is initially provided to the ticket user terminal and cross-checking is performed on payment status.

In this protocol, the ticket user terminal provides a ticket request to a ticket issuer server. In response, the ticket issuer server generates a prevalid ticket and sends a message to the ticket user terminal containing a ticket confirmation and the prevalid ticket. The ticket user terminal may then provide to the ticket issuer server a purchase request with purchase options. In response, the ticket issuer server cross-checks the payment status, generates a bill and corresponding control token and sends to the ticket user terminal a message containing the ticket control token. Upon receiving the message, the ticket user terminal will show a correct ticket appearance according to the ticket control token. The remainder of the protocol is similar to that discussed above.

The basic idea here is to have the active ticket running started at pre-valid status, and cross check the payment with the issuer to decide its latest status and appearance, including:
1. Have not paid—pay now or later,
2. Have paid—show valid ticket appearance, and
3. Have used—show invalid ticket appearance The technique support for this approach includes a communication technique to cross contact the ticket issuer securely (WMA, HTTPS, etc.). Moreover, in order to support ad hoc delivery, payment should attach to a unique number.

The advantages of this approach include: 1) It is unique from OMA DRM, but the ticket delivery can be supported by OMA DRM. 2) It greatly supports mobile payment by making it the easiest way of ticket purchase. 3) It freely supports super distribution of a ticket. 4) It supports using older terminals.

The disadvantages include the need to cross contact with the issuer causes more time, which may raise communication bottle.

FIG. 8c: Location-Based Active Ticketing Protocol

FIG. 8c illustrates a ticketing protocol based on a location-based scheme.

In this protocol, the ticket user terminal provides a ticket request to a ticket issuer server. In response, the ticket issuer server generates a ticket and sends a message to the ticket user terminal containing a ticket confirmation and the ticket. The ticket user terminal may then provide to the ticket issuer server a purchase request with purchase options. In response, the ticket issuer server generates a bill and a unique ticket id link to the user's terminal and sends a message to the ticket user terminal with a payment confirmation. Upon receiving the message, the active ticket in the ticket user terminal will change some characteristic, like appearance, according to the payment confirmation. At a suitable time and location, the ticket issuer server sends to the ticket user terminal a ticket control token. Upon receiving the message, the ticket in the ticket user terminal will be upgraded to a valid ticket then back to the previous appearance after a limited time. The remainder of the protocol is similar to that discussed above.

The basic idea here is to have a driven valid ticket appearance for verification at a suitable time and location by displaying a valid ticket appearance for a limited time, then replacing it by an invalid appearance.

The technique is a location and time based ticket active technique.

The advantages include the following: 1) it is unique from OMA DRM, although the ticket delivery can be supported by OMA DRM, 2) it greatly supports mobile payment by making it as the easiest way of a ticket purchase, 3) it freely supports super distribution of ticket and 4) it support older terminals.

Some disadvantages include the fact that advanced technology is needed for location/time based ticket control.

FIG. 9a: Use Case Ticket Purchase Protocol

FIG. 9a shows an active ticketing application used to purchase a new ticket. In this case, there can be tickets that are actually active tickets, implemented as applications or native Symbian applications (files for applications) using or not using Wallet or something else. These tickets can be listed as applications in the Tickets menu but they are viewed and used via the application. As an overview, an application is used to purchase a new event ticket. The ticket is sent as a MeT ticket and is therefore visible at the terminal Ticket menus. As pre-conditions, the mobile terminal must support MeT tickets and the application to be used must be installed.

The procedure includes the following steps:
1. The user opens the tickets menu and starts a Java ticketing application like TicketServiceINC, for example.
2. The application shows an advertisement of a poster about a concert that the user wants to attend. The user selects 'Purchase' and is transferred to a checkout form that asks for shipping address and payment details.
3. The user views that information on the application and confirms the purchase. Data is sent to the server. The user receives information that payment has been accepted and the key for the ticket that will be delivered soon to the terminal has been received. This communication is preferably proprietary and may vary among different applications. The application shows information that the ticket has been purchased.
4. The application receives a URL indicating where to download the file and downloads it or invokes a Browser to do it.
5. The mobile terminal then tells the user that a ticket has been received. The user looks at the ticket and sees it is the ticket he just purchased so he selects to save the ticket. The ticket is saved to under a Tickets menu/folder.
6. The application can check that the ticket has been downloaded if it so chooses. The user can close the Browser and the application if he so chooses.

Post conditions include downloading the ticket to the mobile terminal.

Other noteworthy criteria include providing that the active ticket applications could support the MeT tickets that the mobile terminal support understands (the Ticket Data part) as well as its own proprietary tickets.

FIG. 9b: Alternative Use Case Ticket Purchase Protocols

As an alternative to the protocol in FIG. 9a, the active ticket might be just sent to the active ticket application and never be shown to terminal MeT ticket support. The scope of the invention is not intended to preclude such applications from existing. They are not described in this use case. In this scheme the ticket is delivered to the mobile terminal similarly to any MeT ticket.

In another embodiment, the active ticket may be received by the application and then sent to a centralized ticket manager or menu. This may be considered a more complex way and requires an active ticket application to support sending a ticket to the mobile terminal, which does not bring any extra benefit to the active ticket application itself and would then be unlikely to be implemented in it.

Alternatively, the MeT ticket may be used to support an encrypted part. In this security scheme, the keys for the ticket encrypted part can be delivered to the application after the application has given its unique key or number (created at installation) and the payment. The server then encrypts part of the ticket so that only this installed application can open it; or alternative key solutions can be used. The user is now holder of a payed ticket and it shows in the appearance of the ticket. The idea of the active ticket is that just downloading the application and a copied ticket does not make you a valid ticket holder.

Before the use of the ticket, a key or command is broadcast or pushed to the terminal to indicate a valid status (out of the scope of the purchase phase).

If the user accidentally deletes the ticket before saving, the user can download it contacting the ticket service provider from the active ticket application. There can be checks done based on MSISDN or something else whether the user has purchased the ticket.

An electronic receipt may be send to the terminal or the active ticket module.

Ticket Browsing

The ticket browsing may work, as follows:
The active ticket could be an application, e.g. possibly a Java application, the end user can activate it by running the mobile active ticket application, or it can be activated by the ticket provider to send a smart message to the user.

If the active ticket is stored in the terminal MeT ticket support or the ticket is just a link to the network (MeT virtual ticket) or an application, these tickets all can be listed in one Tickets menu in the terminal and viewed from there.

FIG. 10a: Validation of Ticket Purchase

The scope of the invention is intended to include using BlueTooth, InfraRed, RFID, WLAN or other radio protocol for validation communication in addition to presentation based validation (visual, according to the ticket appearance).

Or it can use optical reading based on the amount or frequency of the emitted light. Optionally, the active ticket implementation can use smart card services via JSR 177.

For example, FIG. 10a shows a scheme for ticket validation generally indicated as 70. In FIG. 10a, a mobile terminal 72 received an active ticket downloaded from ticket servers 74. The mobile terminal 72 includes a MIDlet module 72a, a JSR 177 module 72b, a JVM module 72c, a smart card 72d and a BT/IrDa/RFID/WLAN 72e, which provides the active ticket to a validation terminal 76 for validation.

FIG. 10b: Alternative of Validation of Ticket Purchase

FIG. 10b shows an alternative validation scheme generally indicated as 80, in which an MeT ticket 82 is downloaded via a browser 84 to a wallet 86 having a ticketing application 86a that provides the MeT ticket 82 to a local connectivity API 86b. When used, the MeT ticket 82 is validated by a validation terminal 88. As shown, the ticketing application 86a may also provide the MeT ticket 82 or some control part of it to a secured memory 89.

Validation in General

The following describes different ways validation can be done according to different technologies. These use mostly available technologies to stress the various possibilities that active ticket offers.

Reader terminal may also be handheld or another mobile terminal or PTD.

Validation can happen with a human checking the ticket appearance or other characteristic, or validation can happen with a camera and software that can check these wanted characteristics automatically.

Using an Event Ticket

In this example, the user may open the ticket application and view a concert ticket. The user may select the functionality button 'Use ticket' when at the gate. Then the user may enter the ticketing gate and places the phone against the ticketing reader. The ticketing reader may give a confirmation sound and the user gets in. The user may see that the ticket application has a marking thereon for use at a current time and views the latest information about the show the user has received as well as an advertisement about one or more articles of merchandise available at a given price and/or location.

Using Event Ticket That Changes with an Image Ticket

In this example, the user may walk toward any manned gate where paper tickets can be used. The user may see notice signs saying that the user should place the ticket ready before entering the gates. The user may open his ticket, which may consist of a big picture that contains the user's face with a visible watermark partly over it and the basic ticket data. The user shows that to the ticket inspector while walking through. The inspector may notice the correct colours in the active ticket or alternatively the right sound or watermark picture. Any presentation format of the active ticket can be used.

Using Ticket with Light Sensor

In this example, the user may walk toward the gate where mobile tickets can be used automatically. The user may notice the signs saying that the user should open the mobile phone and show the ticket when entering to the gate. The user may go to the ticketing reader and places the user's mobile terminal towards the sensor. If nothing happens, then the inspector may then ask the user to select an option saying "use ticket" from the ticket. The user may place the mobile terminal again to the ticketing reader and press "use ticket" option when placing the mobile terminal near the sensor terminal on the wall. If the terminal shows acceptance, then the user can enter.

The user then sees that the ticket is now altered as it is used. The user may receive information text about the show and advertisement about one or more articles of merchandise available at a given price and/or location.

Purchasing New Tickets to a Group

The following describes the purchasing of new tickets to a group:

In one example known as a reservation for all, purchase separately, the user may select the places the user wants to reserve to the user's group of, e.g., five persons. The user then gives the contact information (mobile phone number) of the persons at the reservation. The ticket service contacts (SMS) each person to inform them that reservation has been made for them and when the ticket must be paid at the latest. Each person can then purchase the ticket the way and format the person wishes.

In an alternative example, the user may be ready to pay for all and to purchase the tickets immediately as the user has a sophisticated mobile phone with RFID tag (or midlet support etc.). The user may purchase five tickets and keeps them on the mobile terminal all the time. When the group goes to the event together, the user shows all the ticket with this one mobile device to get everyone in.

Transfer of Active Tickets

The following is a discussion of how the active tickets may be transferred:

In one case, the user has purchased a set of tickets for a group of friends. The user wants to get the money back and give each their own individual ticket so that they are not on the user responsibility.

In this case, the user may upload the ticket back to the ticketing service and give phone numbers on who to allow to download them. Each person will be sent an SMS with the information and unique ticket information code.

Alternatively, the web server on one mobile and others can contact it to download the ticket (MeT ticket, MIDlet). In this case, there is no need to upload the ticket back, as the provider can send a command to remove the ticket.

In a second case, the user has all the tickets on the user's application. The user meets a friend. The friend must have the Active ticket application on the user's friend's mobile terminal as well. The user opens the application and selects to transfer a certain ticket and amount of tickets. The user confirms and sends them to another application via Infrared/RF contactless/Bluetooth. The user's friend opens the application as well and selects to receive, and soon the user's friend gets a message on the display saying that ticket or tickets has been received. Both see the situation on their applications. It also indicates that this ticket has been transferred from MIDlet ID or username.

This kind of transfer can be implemented on tickets that rely on secure element or that require validation command from the server side and can notify a server that they have been moved.

There are also secure ways for transferring the active ticket, as follows:

1) Printing the ticket at the automatic ticket printer/sales desk either before or at the event. Then ticket handling, transfers etc. is manual.

2) Transfer before the download at the mobile. At the purchase is possible to define that tickets are to be downloaded to different terminals.

New Technologies supporting Active Ticket

New technologies presently available support the implementation of the active ticketing method and apparatus described herein, including:

1) MIDP 2.0.

2) WMA (JSR120): Making a convenient SMS-based payment from the active ticket is possible (to purchase valid tickets; and sending of the control token to change the state of the active ticket.

3) Payment API JSR 229: For payment and possibly delivery of the control token to the active ticket.

4) OMA DRM: When providing copy and forward protection, it can be used as one copy protection solution for the active ticket; and non-supporting terminals can use other copy protection solutions.

Any of these are not necessary requirements for the active ticket, but can support some implementations.

Using MIDP 2.0 for Active Ticketing

MIDP 2.0 provides a signed MIDlet mechanism and end-to-end security and features the following:

1) It is possible to run a device trusted mobile application in the mobile terminals (in a permission domain)—authenticate application issuer.

2) It is possible for the mobile application to gain access to the privileged functionality.

3) It is possible to make a mobile application communicate with outside under restriction (e.g. WMA Push Registration Entry).

MIDP 2.0 has a push architecture that makes control token driven ticket appearance detectable and thus forces the ticket operation accordingly, has an over-the-air (OTA) Provisioning that benefits ticket (a Java application) upgrade, and has enhanced user interface that supports advanced ticket presentation.

DRM Solutions

DRM solutions are also viable, including the following:

1) OMA DRM terminal support (operate Java ticket according to the authorized usage rights by e.g. ODRL).

2) Dynamic ticket appearance controlled by the ticket token pushed to the unique ticket—copy protection & super-distribution.

3) Perceptible digital watermarking to protect visible ticket information—issuer's authorization.

4) Ticket owner's photo can also be put into the ticket for easy verification—ticket owner's authentication.

5) Advantages include:
a) Supported by existing infrastructure/standard and mobile device.
b) Avoid complicated PKI-DRM if possible.
c) Possible to push into market within a short period.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. An apparatus comprising:
at least one processor configured to provide to a mobile terminal at least one active ticket and control information for activating or deactivating the at least one active ticket for use by a mobile terminal user, the at least one active ticket having a non-textual ticket characteristic that dynamically changes based on one or more states in a life cycle of the active ticket, wherein the non-textual ticket characteristic is an appearance of the at least one active ticket, and the dynamic changes to the non-textual ticket characteristic include either multimedia changes or other presentation data, including sound, animation, video, still pictures; or a movement of the mobile terminal, an emission of light therefrom, a change of shape; or some combination thereof.

2. An apparatus according to claim 1, wherein the one or more states in the life cycle include a state of being either purchased, validated, invalidated, template, pre-valid, prepared, or some combination thereof for one or more different events.

3. An apparatus according to claim 1, wherein the non-textual ticket characteristic dynamically changes based on a payment by the user of the mobile terminal.

4. An apparatus according to claim 1, wherein the non-textual ticket characteristic dynamically changes based on a predetermined time, status or combination thereof.

5. An apparatus according to claim 1, wherein the non-textual ticket characteristic dynamically changes based on a predetermined or changing geographic location.

6. An apparatus according to claim 1, wherein the non-textual ticket characteristic dynamically changes based on a purchase transaction between a user of the mobile terminal and a ticket service provider system.

7. A system according to claim 1 wherein the non-textual ticket characteristic dynamically changes only after some user interaction based on an embedded algorithm in the active ticket and possible control data received from a ticket issuer.

8. An apparatus according to claim 1, wherein the non-textual ticket characteristic dynamically changes based on an embedded algorithm driven by a control token sent by the ticket service provider system.

9. An apparatus according to claim 1, wherein the active ticket is verified based on image change, sound change, frequency change of the animation, or a combination thereof.

10. A system comprising:
a ticket service provider system; and
a mobile terminal having one or more modules configured to receive, from the ticket service provider system at least one active ticket and control information for activating or deactivating the at least one active ticket for use by a mobile terminal user, the at least one active ticket having a non-textual ticket characteristic that dynamically changes based on one or more states in a life cycle of the active ticket, wherein the non-textual ticket characteristic is an appearance of the at least one active ticket, and the dynamic changes to the non-textual ticket characteristic include multimedia changes or other presentation data, including sound, animation, video, still pictures, or some combination thereof.

11. A system according to claim 10, wherein the one or more states in the life cycle include a state of being either purchased, validated, invalidated, template, pre-valid, prepared, or some combination thereof for one or more different events.

12. A system according to claim 10, wherein the non-textual ticket characteristic dynamically changes based on a payment by the user of the mobile terminal.

13. A system according to claim 10, wherein the non-textual ticket characteristic dynamically changes based on a predetermined time, status or combination thereof.

14. A system according to claim 10 wherein the non-textual ticket characteristic dynamically changes based on a predetermined or changing geographic location.

15. A system according to claim 10 wherein the non-textual ticket characteristic dynamically changes based on a purchase transaction between a user of the mobile terminal and a ticket service provider system.

16. A system according to claim 10 wherein the non-textual ticket characteristic dynamically changes only after some user interaction based on an embedded algorithm in the active ticket and possible control data received from a ticket issuer.

17. A system according to claim 10, wherein the non-textual ticket characteristic dynamically changes based on an embedded algorithm driven by a control token sent by the ticket service provider system.

* * * * *